(No Model.)

L. S. EDLEBLUTE.
SAW.

No. 266,682. Patented Oct. 31, 1882.

Attest:
J. Wm. Strehli
Walter Christopher

Inventor:
Lucius S. Edleblute
per Wm. Hubbell Fisher,
Atty.

UNITED STATES PATENT OFFICE.

LUCIUS S. EDLEBLUTE, OF CINCINNATI, OHIO.

SAW.

SPECIFICATION forming part of Letters Patent No. 266,682, dated October 31, 1882.

Application filed December 19, 1881. (No model.)

*To all whom it may concern:*

Be it known that I, LUCIUS S. EDLEBLUTE, of Cincinnati, Hamilton county, Ohio, have invented certain new and useful Improvements in Saws, of which the following is a specification.

My invention relates more particularly to cross-cut saws; and its object is to produce a saw which will cut more rapidly and with greater ease than saws as now constructed, and this result it accomplishes by peculiar construction and arrangement of the teeth of the saw, as hereinafter described.

I am aware that saws have been heretofore made having cutting-teeth, and between these, at intervals, drag-teeth; but as heretofore constructed these drag-teeth have each been in the form of a double drag, the points of which are so formed as to cut in opposite directions; but this form of drag has been found objectionable for the reason that the point which is not cutting prevents the point which should cut from entering the wood as it ought to, as both points are the same length. My invention obviates this difficulty.

Figure 1:
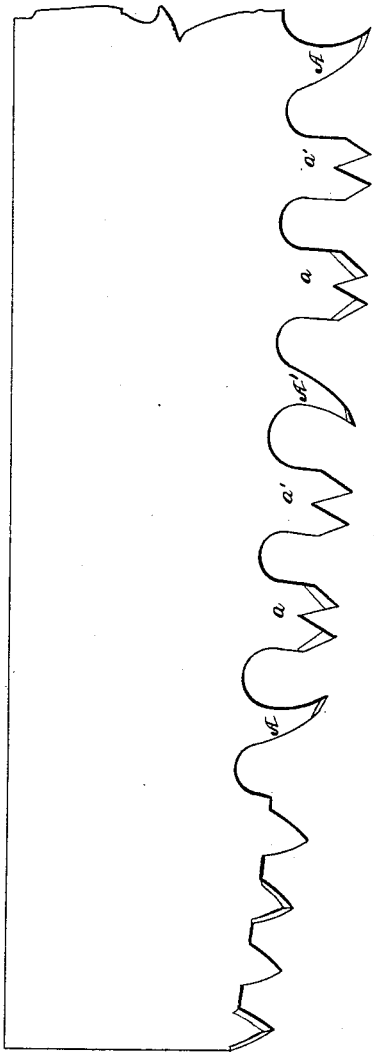
Figure 2:
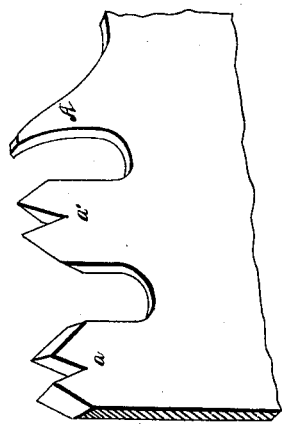

Referring to the drawings forming part of this specification, Figure 1 is a view of a portion of a saw constructed according to my invention. Fig. 2 is a perspective view representing the shape of the various teeth.

The manner in which I form and arrange the teeth is as follows: Two double-lance cutting-teeth, a a', are, as shown, placed side by side, both points of one of said double-lance teeth being beveled on the same side of the saw and being beveled in an opposite direction from that in which the points of the next double-lance tooth are beveled. On either side of this pair of cutting-lance teeth are placed the single drags A A', made hooked-shaped, the points being in opposite directions, one being turned to cut toward one end of the saw and the other toward the other end. In this manner the teeth of the entire saw are formed, first, as in the drawings, a drag pointing toward the handle of the saw; then a pair of double-cutting teeth beveled in opposite directions; next a single drag pointing toward the point of the saw, and so on throughout the saw, a pair of double-cutting teeth alternating with single drags, each alternate drag pointing in an opposite direction from the one preceding it. The cutting-lance teeth are preferably filed, as shown in the drawings, the direction of the notch between the two points of the tooth being at right angles to the face of the saw, and the side of each point opposite to this notch being filed with a long bevel to give each point a sharp lance shape. The point of each drag is made diamond-shaped, leaving the longest point in the center of the drag. Between the cutting-teeth and between the cutting-teeth and the drags are deep oval notches to prevent the sawdust from clogging the saw. The cutting-edge of the saw is made in a continuous curve, permitting each cutting-tooth and drag to perform its share of the work. The cutting-teeth, being beveled in opposite directions, leave a V-shaped ridge in the center of the cut, and the drag-teeth, being diamond-pointed, remove this ridge, and each drag, being separated from the next one, is permitted to enter the wood to the required extent.

If desired, the cutting-teeth may each have but one point instead of two, as shown in the drawings; but such a tooth will not be so thoroughly operative as the double-pointed tooth.

By constructing saws after the principle of my invention a gain of twenty per cent. in the speed of cutting may be attained.

What I claim as new and of my invention, and desire to secure by Letters Patent, is—

A saw composed of a series of double-pointed cutting-teeth, a a', beveled in opposite directions, each pair of cutting-teeth being separated by a single drag, each alternate drag being pointed in opposite directions, and each drag being diamond-pointed, substantially as and for the purposes specified.

LUCIUS L. EDLEBLUTE.

Witnesses:
 A. S. LUDLOW,
 E. R. HILL.